Dec. 17, 1946.   W. H. SILVER   2,412,754
HITCH DEVICE
Filed June 5, 1944
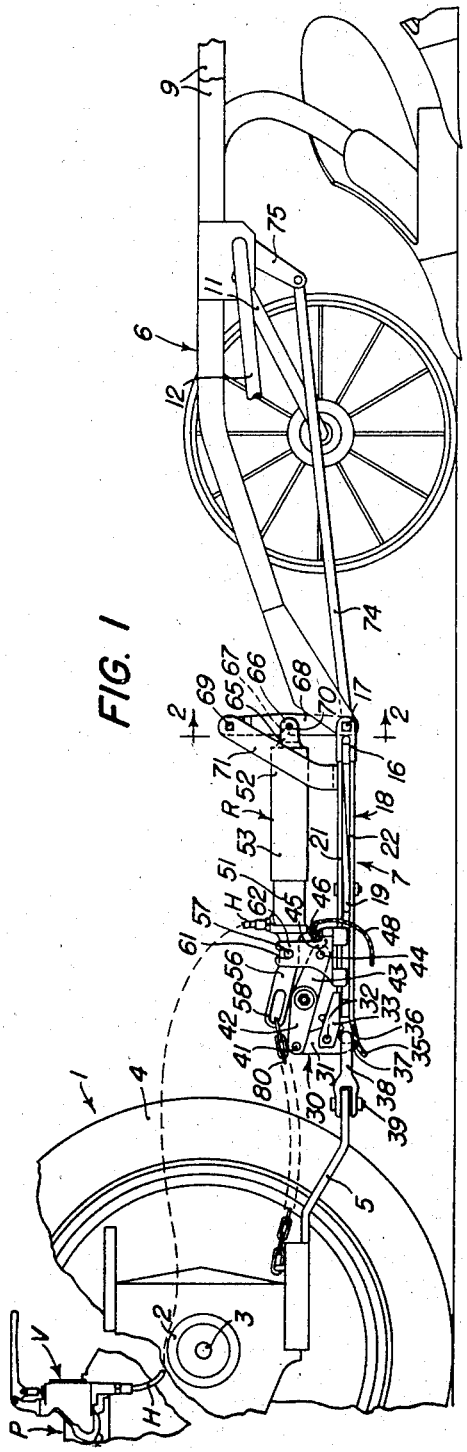
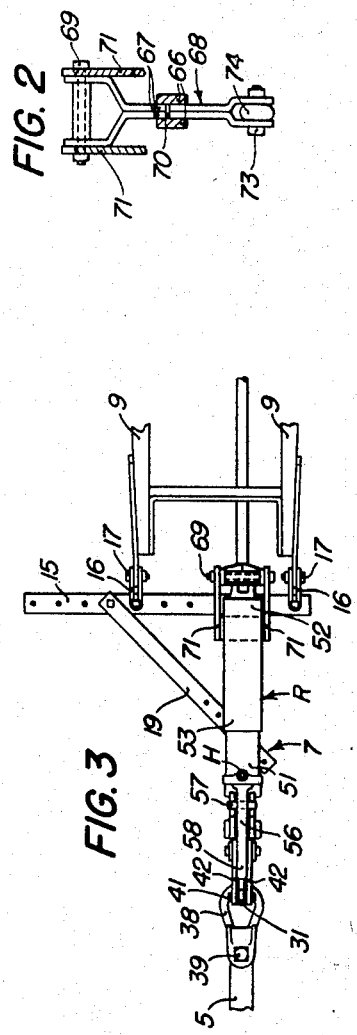
INVENTOR.
WALTER H. SILVER
ATTORNEYS Patented Dec. 17, 1946

2,412,754

UNITED STATES PATENT OFFICE 2,412,754

HITCH DEVICE

Walter H. Silver, Moline, Ill., assignor to Deere & Company, Moline, Ill., a corporation of Illinois Application June 5, 1944, Serial No. 538,824

16 Claims. (Cl. 97—50)

The present invention relates generally to agricultural implements and more particularly to hitch devices for connecting a trailing implement to its propelling tractor and power lift apparatus particularly adapted for use with implements of this kind.

The object and general nature of the present invention is the provision of a releasable mounting for a hydraulic ram unit deriving power through a flexible hose connection from the tractor and connected with the implement part that is to be adjusted so that adjustment of the same may be effected by hydraulic power deriving energy from the tractor, in connection with overload release mechanism operatively connecting the implement with the tractor and including means shiftable in a direction to dislodge the ram unit from its releasable mounting and so free the ram unit from the implement upon the occurrence of an overload. More particularly, it is a feature of this invention to provide an overload release device which may be manually released, as is desirable in order to provide for hitching the implement to the tractor by hand, but in which the releasable ram unit is so mounted that after operation has been established the overload release mechanism cannot be released by hand unless the ram unit is actually removed from the implement. One advantage of this construction is that, while retaining the advantages of a manual release for the hitch, the hitch is prevented from being released manually so long as the ram unit is mounted on the cylinder and damage to the connecting hose might conceivably be inflicted in the event that the tractor should be driven forward away from the implement after it has been unhitched therefrom but before the ram cylinder has been removed from the implement.

These and other objects and advantages of the present invention will be apparent to those skilled in the art after a consideration of the following detailed description, taken in conjunction with the accompanying drawing.

In the drawing:

Figure 1 is a fragmentary side view of a tractor and trailing implement combination in which the principles of the present invention have been incorporated.

Figure 2 is a view taken generally along the line 2—2 of Figure 1.

Figure 3 is a partial plan view of the hitch connections shown in Figure 1.

Referring first to Figure 1, the tractor is indicated in its entirety by the reference numeral 1 and is of conventional construction, embodying a rear axle 2 in which axle shafts 3 are journaled for rotation. Rear wheels 4 are fixed to the outer ends of the axle shafts, and the tractor is provided with a drawbar 5. A tractor plow, indicated in its entirety by the reference numeral 6, is shown as connected in draft receiving relation with the tractor by means of a hitch structure 7, which may be considered as a part of the plow 6. The latter includes beams 9 in which furrow and land wheel crank axles 11 and 12 are rockably mounted, each carrying a ground wheel.

The hitch structure 7 comprises a transverse hitch bar 15 having a plurality of openings therein and pivotally connected through pivot bolts 17 to the front ends of the plow beams 9 by clevises 16. A forwardly extending main draft bar 18 is connected at its rear end to the transverse hitch bar 15 and is reenforced by a brace 19 connected with the bars 15 and 18. The main draft bar comprises upper and lower members 21 and 22 held apart by suitable spacers, and the portion of the main draft bar 18 where the brace 19 joins thereto is reenforced by an angle 23. The hitch structure 7 is provided with a safety release hitch constructed along the lines of the safety release hitch shown in the co-pending application, Serial No. 486,436, filed May 10, 1943, by John I. Cantral, now United States Letters Patent No. 2,381,258, dated August 7, 1945, to which reference may be made if necessary. Briefly, the safety release hitch, indicated in its entirety by the reference numeral 30, comprises a generally vertically arranged lever 31 pivotally mounted on a pin 32 carried by brackets 33 that are fixed to the front end of the upper draft bar 21. The forward end of the lower draft bar 22 is angled downwardly and forwardly, as at 35, and is slotted, at 36, to receive the lower hook section 37 of the lever 31. A clevis or draft member 38 is adapted to be engaged behind the hook section 37 and to be connected by any suitable means, such as a bolt 39, to the rear end of the tractor drawbar 5. The upper end of the lever 31 is apertured to receive a pin 41 to which the forward ends of a pair of strap members 42, constituting one toggle link, are connected. Two rear strap members 43, constituting a second toggle link, are pivoted at their forward ends to the rear ends of the toggle straps 42, and the rear ends of the toggle straps 43 are pivoted on a pin 44 carried by a slide or anchoring member indicated in its entirety by the reference numeral 45. The inchoring member 45 is provided with a spring biased plunger 46 which is adapted normally to enter one of the openings 47 formed in the upper strap 21. A cable 48 is connected to the upper end of the spring biased plunger 46 so that by exerting an upward pull on the plunger 46, the slide or anchoring member 45 is released from connection with the main draft bar 18, and hence the anchoring member 45 and the toggle links 42, 43 may be shifted rearwardly to open the hook end 37 by hand, thus providing for the release of the implement at any time from the tractor clevis 38. The toggle links 42, 43 are connected together by a cam arrangement which is best shown in the co-pending application identified above and which need not be repeated here except to say that by the provision of suitable clamping means and resilient members, such as rubber or rubber-like bushings, the two toggle links 42, 43 are normally maintained in their straightened relation, but the toggle members may be buckled upwardly whenever, with the anchoring member 45 anchored in position on the main draft bar 18, the pull exerted by the tractor on the implement becomes excessive. When that occurs the lever 31 swings in a direction to buckle the toggle links upwardly and thus rock the nose or hook-like section 37 forwardly, which permits the tractor to move on while the implement remains behind.

The present invention is more particularly concerned with the provision of new and improved hydraulically operated units deriving energy from the tractor, particularly a fluid pump thereon, and operating to adjust a part or parts on the implement. For example, it may be desired to swing the crank axles 11 and 12 by power derived from the tractor.

Referring now to this phase of the invention, the tractor carries suitable valve mechanism V which serves to control the flow of fluid to and from a ram unit R that is carried by the plow. Specifically, the tractor valve mechanism controls the flow of oil from a pump P on the tractor back through a hose H to the forward end of a cylinder 51 that forms a part of the ram unit R. A piston 52 is shiftably disposed in the cylinder and is forced outwardly (rearwardly) by oil or other hydraulic fluid from the tractor, all under the control of the valve box V. A protecting sleeve 53 carried by the piston 52 surrounds the rear end of the cylinder 51.

The front end of the ram unit R, particularly the cylinder 51 thereof, is provided with an extension 56 that carries a pair of laterally directed lugs 57, and this portion of the cylinder is extended farther forward to form a trip handle 58 to which more detailed reference will be made below. The trip extension or handle 58 overlies the toggle links 42, 43. The lugs 57 at the front end of the ram unit R are received in slots 61 formed in the upper ends of a pair of plates 62 that are fastened to opposite sides of the anchoring member 45 in any suitable manner. At the other end of the ram unit R, the piston section thereof is extended, as at 65, and carries a pair of laterally directed lugs 66. These latter lugs are apertured to receive a pin or bolt 70 that is adapted to be disposed in slots 67 formed in a swinging lever 68. The latter is preferably made up of a pair of strap members and at its upper end is pivoted, as at 69, to a bracket 71 formed on or carried by the main draft member 18. The lower end of the swinging lever 68 is apertured, as at 73, to receive the forward end of a push bar 74. The rear end of the push bar 74 is connected to an arm 75 fixed to the land wheel crank axle 12. The crank axles 11 and 12 are connected together for simultaneous movement by mechanism which it is not necessary to show here. The arm 75 extends generally downwardly so that a rearward push transmitted thereto by the push bar 74 serves to swing both of the crank axles 11 and 12 downwardly and thus raise the plow with respect to the ground wheels. It will be noted, first, that the slots 61 are curved slightly, more or less about the pin 70 carried by the lugs 66 as a center and that the slots 61 are open at the top. It will also be noted that the rear slots 67 are arranged in an angled position upwardly and forwardly, and further, it will be noted that the pivot connection 73 between the arm 68 and the link 74 is disposed closely adjacent the axis of swinging movement between the hitch structure 7 and the plow 6. Hence vertical swinging of the hitch structure 7 has very little effect for changing the adjustment effected by the ram R and push bar 74.

It will also be noted that when the ram unit R is in position in the slotted members 62 and 68, it closely overlies the upper end of the plunger 46 and is effective to prevent the latter from being drawn upwardly, even though a pull should be exerted on the cable 48. Hence, the ram cylinder R so long as it is in position serves as means effective to prevent the manual release of the overload trip device 30. Thus, it becomes impossible for the operator to manually release the safety trip 30 and start to drive away from the implement while the ram unit R still remains connected to the implement. When the farmer desires to manually disconnect from the implement, he first must grasp the ram handle 58 and lift the ram unit R from its mounting on the implement. Thereafter a pull on the cable 48 is then all that is required to release the safety trip 30.

The operation of the safety trip 30, as under an overload, also serves to automatically disconnect the ram unit R from the implement. As will be best understood from Figure 1, if during operation abnormal loads are encountered, the forward pull tends to swing the upper end of the lever 31 rearwardly, and if the overloads are excessive the forces involved become sufficient to buckle the toggle links 42, 43 upwardly. Since the forward extension 58 of the ram unit R overlies the toggle links, this upward buckling of the links serves to rock the ram unit R upwardly at its front end, generally about the rear lugs 66 as a center, but as soon as the front lugs 57 are released from the slots 61, the ram unit R becomes detached from the implement, since the rear end of the ram unit may merely slip forwardly and upwardly out of the slots 67. Generally the hose H is sufficient to pull the ram unit away from its releasable mounting on the implement, but if desired a separate chain or other flexible element may be connected between the ram unit and the tractor, as indicated by the reference numeral 80.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In combination, a tractor having a hydraulic power lift ram unit flexibly connected therewith and means for controlling said ram unit, an agricultural machine having a part to be controlled, means for detachably mounting said ram unit on the agricultural machine for operating said part, an overload release hitch for connecting the agricultural machine to the tractor for releasing the latter from the machine upon the occurrence of an overload and including means having a member movable from one position to the other and into contact with said detachably mounted ram unit for displacing the latter when said hitch releases, for detaching said ram unit from said implement.

2. In combination, a tractor having a hydraulic power lift ram unit flexibly connected therewith and means for controlling said ram unit, an agricultural machine having a part to be controlled, means for detachably mounting said ram unit on the agricultural machine for operating said part, an overload release hitch for connecting the agricultural machine to the tractor for releasing the latter from the machine upon the occurrence of an overload and including means having a member movable from one position to the other to effect the release of said overload release hitch, and means connected with said ram unit and normally disposed thereby in a position to be engaged by said member during its movement to release said hitch for detaching said ram unit from said implement.

3. In combination, a tractor having a power lift unit, an implement having a part to be shifted, a releasable connection extending betwe said unit and said part, a hitch connection releasable under overload between the tractor and said implement and including a member movable from one position to another to effect a release of the implement from the tractor, and means operated by movement of said movable member for releasing said first connection.

4. In combination, a tractor having a source of fluid under pressure and controlling means therefor, an implement having a part to be adjusted and a pair of relatively movable slotted members, one of which is connected with said implement part to shift the latter, a ram unit connected with said source to be operated thereby and removably mounted in said slotted members, a releasable hitch connecting the implement with the tractor, and means responsive to the release of said releasable hitch for detaching said ram unit from said slotted members.

5. In combination, a tractor having a source of fluid under pressure and controlling means therefor, an implement having a part to be adjusted and a pair of slotted members, one of which is movable with respect to the implement and connected with the implement part to shift the latter, a ram unit having lugs seating in the slots of said members and operatively connected with said source of fluid pressure to be operated thereby, the angularity of said slots serving normally to retain said ram unit in position, extension of said ram unit serving to shift said movable member and move said implement part, a releasable hitch connecting the implement with the tractor and including a part movable in a given direction when the implement is released from the tractor, as by an overload, and mechanism operatively connected to be shifted by said hitch member and arranged to release said ram unit from said slotted members upon release of the implement from the tractor.

6. In combination, a tractor including a source of power, an implement having a part to be adjusted, hitch means connecting the implement with the tractor and including a structure swingable about a generally transverse axis with respect to said implement, a first member swingably connected with said hitch and including an end movable adjacent said transverse axis, means operatively connecting said end with said implement part whereby swinging movement of said member serves to adjust said part, a power operated device supported removably on said hitch structure and said member and capable of being removed therefrom, overload release means connecting the front end of said hitch structure with the tractor and including a part movable upon the release of the implement from the tractor, and means operated by said last mentioned part for releasing said power operated unit from said hitch structure and said swingable member.

7. The invention set forth in claim 6, further characterized by said power operated device constituting a ram unit having an extension thereof adapted to be contacted by said overload release mechanism.

8. An agricultural implement comprising a part to be shifted, a releasable overload responsive hitch for connecting the implement with a tractor and including a pair of relatively movable parts movable, one relative to the other, during the releasing of said implement from the tractor, a power unit releasably mounted on the implement and operatively connected with said implement part, and means disposed in a position to be engaged by one of said pair of relatively movable parts of said release hitch for disconnecting said power device from the implement.

9. In an agricultural implement having a part to be adjusted and a releasable ram unit removably mounted on the implement and connected to adjust said part, an overload release hitch for connecting the implement to a tractor, said hitch including a pair of toggle links adapted to buckle outwardly upon the occurrence of an overload, and means responsive to outward buckling of said toggle links for releasing said ram unit from the implement.

10. In an agricultural implement having a part to be adjusted and a releasable ram unit removably mounted on the implement and connected to adjust said part, an overload release device for connecting the implement to a tractor and including a member shiftable generally upwardly upon the occurrence of an overload, and means responsive to upward movement of said member for releasing said ram unit from the implement.

11. In an agricultural implement having a part to be adjusted, a ram-receiving anchoring member, a shiftable member carried by said implement for receiving said ram and connected with said implement part to shift the latter, said ram-receiving members having open end slots, a ram unit removably disposed in said slots, an overload release device for connecting the implement to the tractor, and means responsive to the release of said device for removing at least one end of said ram unit from one of said slotted members.

12. In an agricultural implement, hitch mechanism including an overload release device operative upon the occurrence of an overload for releasing the implement from a propelling agency and including a part movable from one position to another during the releasing of the implement, means connected with said agency and releasably mounted on the implement, and mechanism positioned to be engaged by and operated by movement of said movable part of the overload release device for releasing said last mentioned means from said implement.

13. In an agricultural implement including means serving as a main frame, a hitch structure pivoted thereto for movement about a generally transverse axis, said implement having a part to be shifted, a member movably mounted on the implement and having a portion substantially adjacent said tranverse axis, and an expansible hydraulic ram unit mounted on said hitch structure and connected at one end to said shiftable member.

14. In an agricultural implement having a part to be shifted, hitch mechanism for connecting the implement to a propelling agency, said hitch mechanism including parts shiftable into a released position upon the occurrence of an overload, and mechanism for also shifting said parts so as to release the implement from the tractor other than upon the occurrence of an overload, a power operated device removably mounted on the implement and operatively connected with said implement part for shifting the latter, and means for releasing said power operated device from the implement when said hitch part shifts in response to an overload, said power operated device also being manually removable from the implement and adapted, when in place thereon, to block the releasing movement of the manual release of said hitch device and thus prevent the manual release of the latter.

15. In an agricultural implement adapted to be hitched to a tractor having a source of fluid under pressure, of a part on the implement adapted to be shifted by power, a power unit flexibly connected with said source of power on the tractor and connected with said implement part for shifting the latter, means for releasably mounting said power operated unit on the implement, said unit being manually removable therefrom, a releasable overload hitch mechanism for connecting the implement with the tractor, said mechanism including a part engageable with a part on said power operated device for automatically releasing the latter from the implement upon the occurrence of an overload resulting in the tripping of said releasable hitch device, and mechanism for manually releasing said overload hitch release device, said manual release mechanism being disposed in a position adjacent said power operated device, when the latter is on the implement, so as to be blocked by the power operated device from being released so long as said power operated device is in place on said implement.

16. An agricultural implement comprising a part to be shifted, a power unit operatively connected with said implement part, a releasable hitch for connecting the implement with the tractor including manually movable means for releasing said hitch, and means for mounting said power unit on the implement in such position that the power unit blocks the movement of the releasable hitch and thus prevents the operation of said manual means so long as said power unit is mounted in position on said implement.

WALTER H. SILVER.